United States Patent [19]

Carlson et al.

[11] 3,999,726
[45] Dec. 28, 1976

[54] HELICOPTER PYLON-FUSELAGE COUPLING FOR EXPANDED CG RANGE

[75] Inventors: Floyd W. Carlson; Wesley L. Cresap, both of Fort Worth, Tex.

[73] Assignee: Textron, Inc., Forth Worth, Tex.

[22] Filed: May 29, 1975

[21] Appl. No.: 581,827

[52] U.S. Cl. .................. 244/83 J; 244/17.27; 416/148
[51] Int. Cl.$^2$ ........................ B64C 27/72
[58] Field of Search ......... 244/17.11, 17.25, 17.27, 244/83 R, 83 G, 83 J; 416/102, 121, 148

[56] References Cited

UNITED STATES PATENTS

| | | | |
|---|---|---|---|
| 2,163,481 | 6/1939 | Cameron | 416/148 |
| 2,402,349 | 6/1946 | Sikorsky | 416/102 |
| 2,468,913 | 5/1949 | Avery | 244/17.25 |
| 2,615,657 | 10/1952 | Young et al. | 244/17.27 |
| 3,118,504 | 1/1964 | Cresap | 244/17.27 X |
| 3,514,052 | 5/1970 | McKeown | 416/102 X |

Primary Examiner—Trygve M. Blix
Assistant Examiner—Galen L. Barefoot
Attorney, Agent, or Firm—Richards, Harris and Medlock

[57] ABSTRACT

A helicopter fuselage is coupled to a pylon to permit fore/aft pivotal movement of the fuselage relative to the pylon with resilient means connected between the pylon and fuselage to oppose and limit such pivotal movement. Structure is then provided to decouple the rotor control linkages to permit limited fore/aft rotation of the fuselage relative to the pylon upon change of location of the center of gravity without introducing control motion in the control linkages. The control linkages include control tubes extending longitudinally of the fuselage from a pilot input location. Bell cranks are connected to the control tubes and are coupled as to control the pitch of rotor blades. Structure connecting the fuselage and each bell crank alters the pivot points of the bell cranks relative to the fuselage. The positions of the bell crank pivot points depend upon rotation of the fuselage relative to the pylon.

1 Claim, 4 Drawing Figures

HELICOPTER PYLON-FUSELAGE COUPLING FOR EXPANDED CG RANGE

This invention relates to reduction of the amount of available control that is used up in accommodating changes in the location of the center of gravity (CG) in a helicopter, and more particularly to enhancing the range of permissible CG locations due to helicopter loading while maintaining adequate margins of control through the pilot input.

In the operation of helicopters, load placement has to be sufficiently controlled to maintain maneuverability of the aircraft by the pilot. Control stick movement is transmitted through control linkages to control surfaces on the aircraft so that the desired maneuvers can be executed. The control stick on a helicopter necessarily is constructed to have a limited range but designed to permit execution of all desired maneuvers within the limited range. Performance and safety requirements dictate that the pilot control the aircraft through all permissible maneuvers without moving the control stick beyond safety margins established somewhat inside the limits of the available range of control stick movement. That is, there must always be margins remaining beyond the extremities of control stick movements permissible for all prescribed or permitted maneuvers under all conditions of loading.

Helicopters are loaded, unloaded and reloaded with different cargoes. The center of gravity of a loaded fuselage changes in location from load to load depending upon the load position in the cabin. This often requires readjustment of load position or careful initial distribution of load components in order to end up with the position of the center of gravity within a limited field. When the center of gravity is thus positioned within the limited field, the aircraft may then be maneuvered within the limits dictated by its design without difficulty. When a given ship is certified by the governmental authorities, the CG field, size and location are certified and specified. The ship, once certified, cannot legally be operated with loads such that the CG is outside the certified field.

The present invention is directed to a system of construction of a helicopter in which the CG range is considerably extended while maintaining the safety margins in the pilot control.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
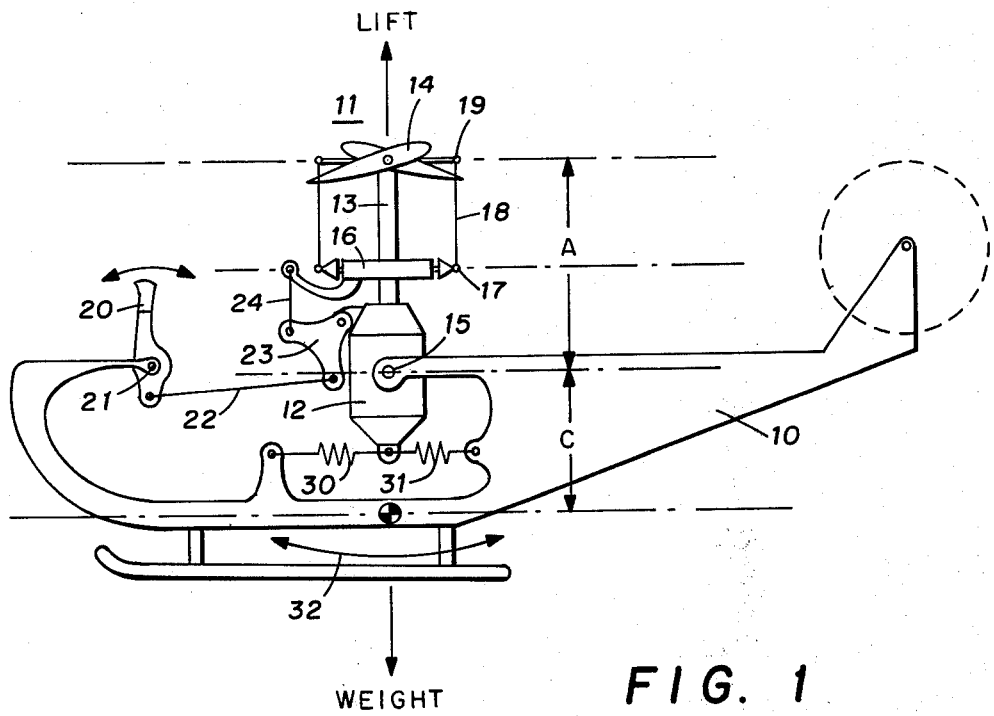
FIG. 1 is a diagrammatic representation of a control linkage in a helicopter embodying the present invention.

Referring now to FIG. 1, a helicopter has been diagrammatically illustrated as comprising a fuselage 10 having a pylon 11 which includes a transmission 12, a mast 13 and a rotor 14.

Fuselage 10 is pivotally supported relative to the pylon at a pivot 15. The pivot 15 is on a transverse axis so that the fuselage may rotate in the fore and aft sense relative to the axis of the mast 13.

A conventional swashplate 16 is non rotatably mounted relative to the transmission 12. A rotating portion 17 carried by the swashplate is coupled in conventional manner by pitch links 18 to pitch horns 19 on blades on the rotor 14. A control stick 20, pivoted at point 21, is coupled by way of control link 22, bell crank 23 and control link 24 to the swashplate 16 thereby to provide for control inputs to the rotor 14.

In accordance with the present invention, the mounting of the fuselage 10 relative to the pylon 11 is made relatively soft in the fore/aft sense. Resilient restraints such as indicated by springs 30 and 31 are coupled between the transmission 12 and the fuselage 10 so that the pivotal movement of the fuselage, as indicated by arrow 32, can be accommodated and yet restrained so that the motion is limited. The attitude of the fuselage 10 relative to the mast 13 is controlled in accordance with a predetermined function depending upon the constants of the springs and the lengths of the arms involved.

Further in accordance with the invention, the control linkage from the control stick 20 to the swashplate 16 is so arranged that rotational motion of the fuselage 10 relative to the mast 13 is effectively decoupled, i.e., rotational motion of fuselage 10 relative to the pylon 11 causes zero or minimal changes in the position of the control stick 20.

It will be readily visualized that under normal operation the pilot follows a pattern of manual control movements to cause lift-off, hover, forward, rearward or sideway flight or ascend or descend. From such movements, the pilot normally expects a given response of the aircraft. However, if the aircraft is loaded such that the center of gravity is not at the same location as the center of gravity with no load, then upon lift-off, without the soft mounted pylon, the helicopter along with its pylon and controls, rotates under the rotor until the center of gravity of the aircraft is under the center of lift of the rotor. This movement of the controls relative to the rotor must be compensated for by pilot inputs which, of course, uses up some of the available traverse. However, if the present invention is used, the soft pylon mounting permits much of the relative rotation to occur on the pylon-to-fuselage pivot and this portion of the rotation does not alter the rotor-controls relationship due to the decoupling arrangement of the controls. If the control linkage from the stick 20 to the pitch horn is not decoupled, then such rotation would introduce control inputs to the rotor which are undesirable with the stick being fixed. If the linkage is not uncoupled, then in order to bring about the desired maneuvers of the aircraft during takeoff, the pilot would have to introduce control inputs to accommodate the rotation of the fuselage relative to the mast, thereby using up some of the control movement available to him.

The present invention permits a greater range in the location of the center of gravity during loading without requiring such compensating controls by the pilot. That is, the control linkage is decoupled so that there is but minimal or no change required in the control system upon rotation to accommodate change of center of gravity location.

While the foregoing description has been concerned with the construction illustrated in FIG. 1 where the problem of adjustment for variations in the fore/aft sense of the center of gravity have been compensated, it is to be understood that the same principle may be applied to accommodate changes in position laterally of the center of gravity.

Figure 2:
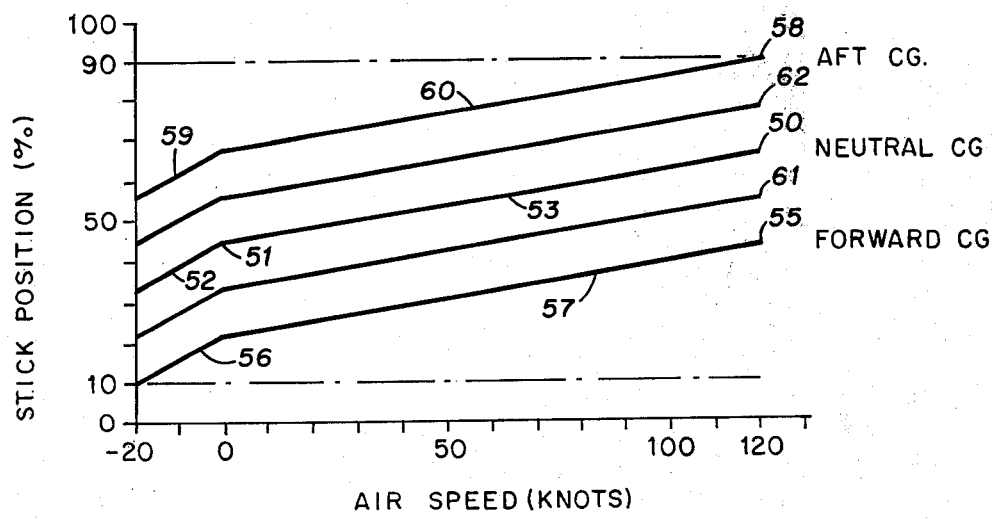
FIG. 2 illustrates an expansion of the CG range affected by utilizing the present invention.

Referring now to FIG. 2, a graph is shown wherein the abscissa are plotted in terms of air speed. The ordinants are plotted in terms of stick position (percentage) of total range. The example given is one in which the performance of an aircraft under consideration is required to have a forward speed of up to 120 knots and a reverse speed of 20 knots. The control range of the pilot's control stick is required to have a margin of at least 10% when the aircraft has been placed in an attitude to travel in the reverse direction at 20 knots. On the upper end of the forward speed range, the control stick similarly must have a margin of 10% when at the maximum speed. All operations under all load conditions must thus be executed by the pilot's input through the control stick within the 80% of the control total stick range, i.e., the limited range between the prescribed margins.

With the center of gravity at the neutral location, the range of control stick movement throughout the speed range of from −20 knots to +120 knots may be such as represented by curve 50. That is, at hover (zero forward speed), the control stick would be at the midpoint of its range as represented by the point 51. In order to fly the ship backwards, the control stick would have the movement represented by the segment 52. In order to fly the ship forward, the control stick would have the movement represented by the segment 53.

If, on the other hand, the ship is loaded such that the center of gravity is moved forward to the prescribed limit, then the curve 55 may be taken as representative of the control to be introduced through movement of the control stick. That is, in flying at a −20 knots, the control stick is moved to introduce control represented by the segment 56. This pushes the controls to the margin required to be maintained. Then in flying forward, the segment 57 would represent the input control movement.

If the loading differs from the foregoing such that the center of gravity is to its aft limit, the curve 58 may be taken as illustrative of the controls necessary. The −20 knot speed is represented by execution of the control in accordance with segment 59 and the forward speed of 120 knots is represented by the control of the segment 60. The displacement between curves 55 and 58 represents the amount of control stick movement actually used up by shifting the position of the center of gravity. The present invention permits in an aircraft equipped with the controls and linkages such as embodied in the present invention to accommodate load CG's to be positioned anywhere within a wide range. More particularly, with the center of gravity shifted forward or aft to the same degree as considered in connection with curves 55 and 58, respectively, the control stick movement used for control would be only that represented by curves 61 and 62, respectively. That is, utilizing the present invention, there is a greater range over which the center of gravity may be positioned without exceeding the limits of control stick movement for the prescribed maneuvers of the aircraft. This means that aircraft loading may not require the same precision or discipline with the present invention as in ships that do not embody the present invention. This permits basic design of the aircraft to be altered to take advantage of the increased range of CG location. Stated otherwise, less control is required for the same CG range in a ship embodying the present invention compared with one that does not embody the present invention.

Figure 3:
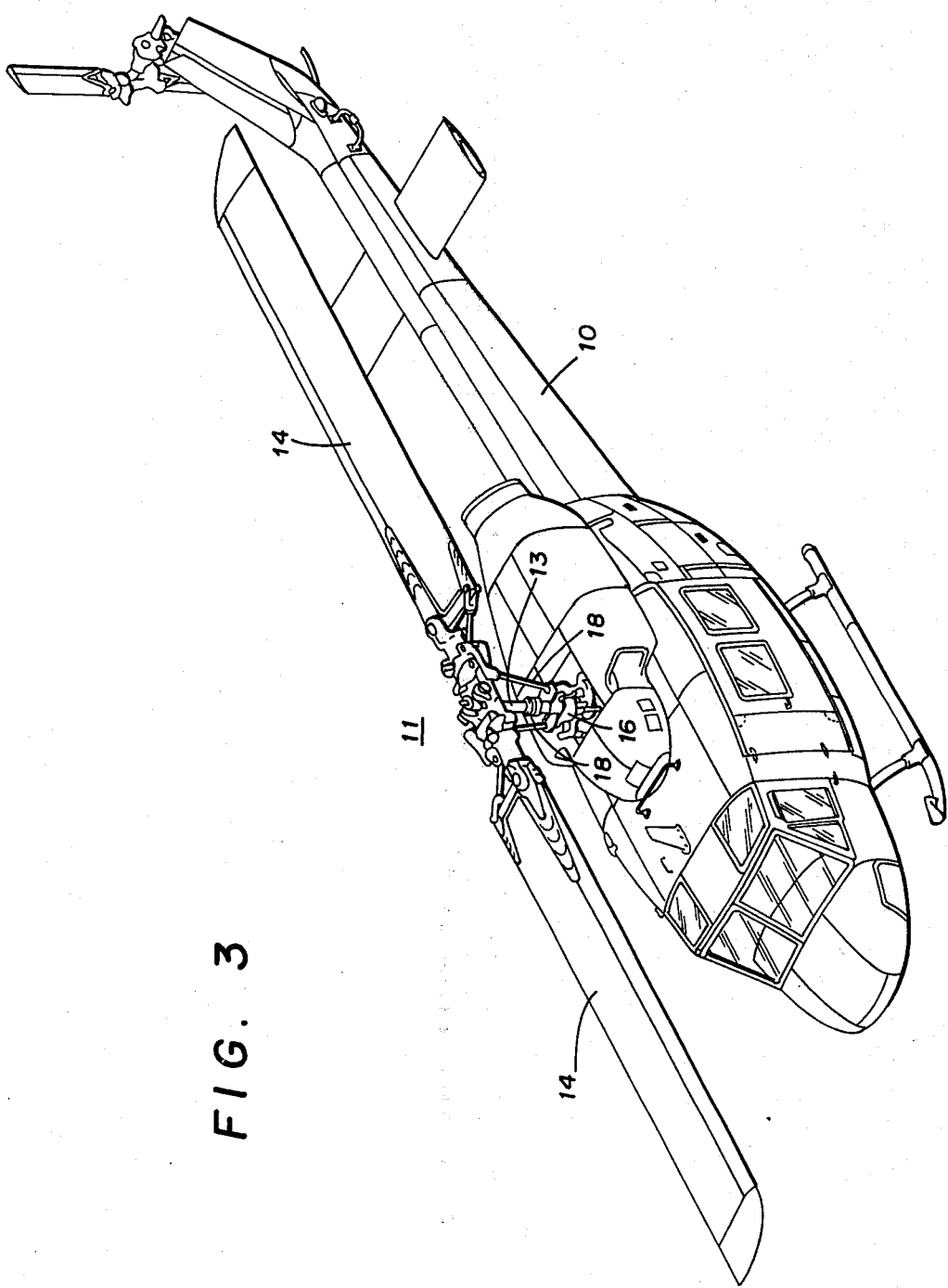
FIG. 3 illustrates a control linkage for a dual blade helicopter.
Figure 4:
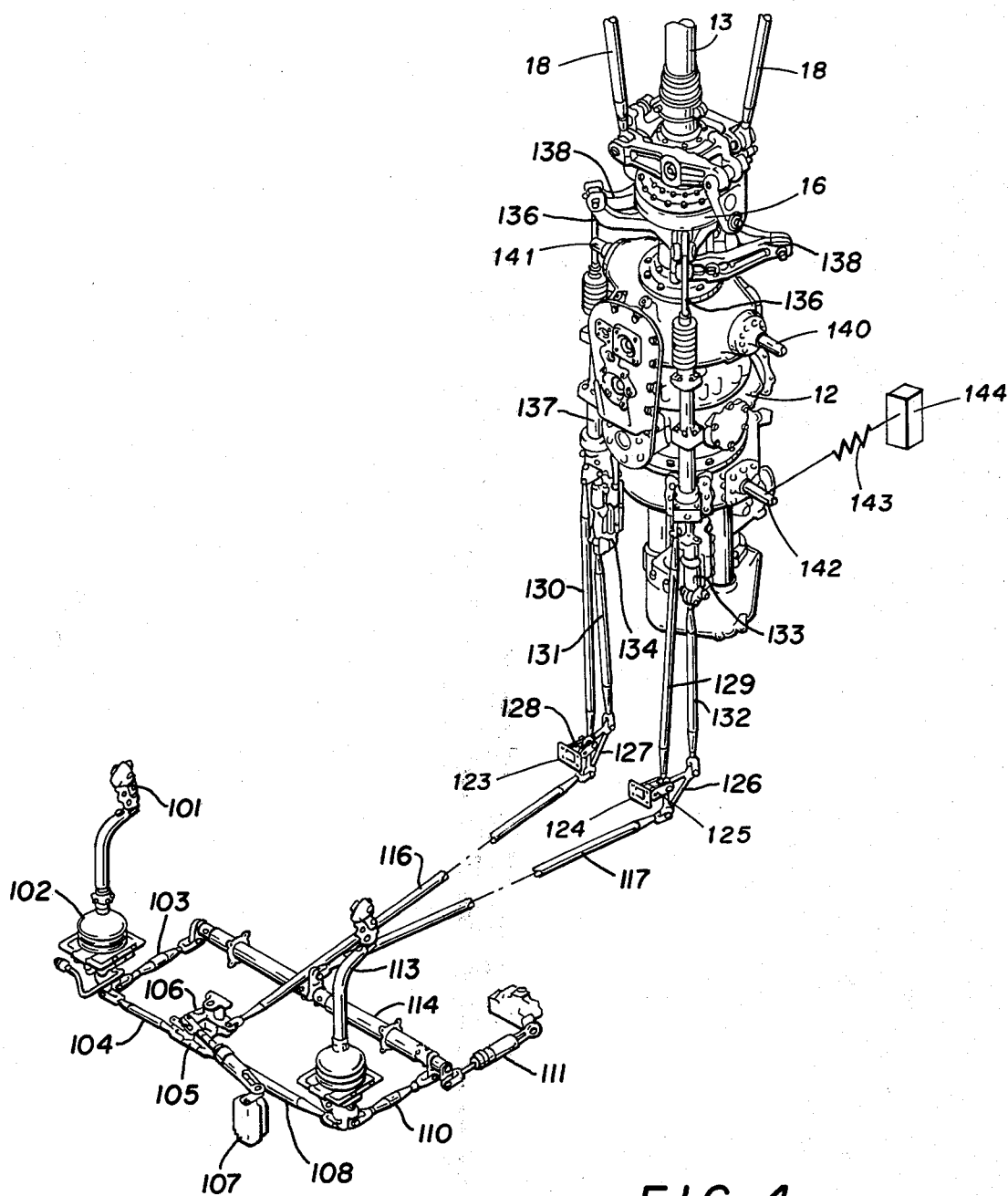
FIG. 4 is a diagrammatic view, partially broken away, of the input for the linkage illustrated in FIG. 3 and embodying the present invention.

The illustration of the present invention in FIG. 1 is diagrammatic only. The invention in practical embodiment is shown in FIGS. 3 and 4. FIG. 3 illustrates a helicopter having fuselage structure 10 which is to be supported by forces generated by rotor 11. Mast 13 links the main rotor 11 having blades 14 to a transmission housed within the fuselage 10. Control links 18 extend from swashplate 16 to pitch horns on main rotor 11.

In FIG. 4, the control system has been shown broken away from the rest of the system and is illustrated in its relationship to the transmission 12 which drives mast 13 and which provides control motion through the swashplate 16 to the control links 18.

The system illustrated in FIG. 4 is the cyclic control system wherein a pilot's cyclic stick 101 is connected through a pivotal structure encased within a boot 102 to control tubes 103 and 104. A control tube 103 leads to a crank arm on a cyclic jack shaft 114. A control tube 104 is connected to a lateral transducer 105 which has a bell crank 106 connected to a lateral force gradient unit 107. In a similar manner, the copilot's cyclic stick 113 is connected through control tube 108 to the lateral transducer 105 and through control tube 110 to the cyclic jack shaft 114.

Control tube 116 extends from bell crank 106 and control tube 117 extends from a crank arm on cyclic jack shaft 114, respectively. The cyclic jack shaft 114 is connected through a fore and aft force gradient unit 111 to a fore and aft rotary actuator unit 112.

By such structure, a pilot or copilot may introduce control motion through control sticks 101 and 113. Such motion is translated into fore/aft command motion on control tube 117 and lateral command motion on control tube 116.

Control tube 116 is connected to a pivot on a bell crank 127. Bell crank 127 is pivotally connected to the outer end of an idler arm 128 which is pivotally secured at its opposite end to fuselage structure represented by the rectangle 123. Similarly, control tube 117 is connected to the lower pivot on a bell crank 126. Bell crank 126 is pivotally supported on the outer end of an idler arm 125 the other end of which is pivotally connected to fuselage structure represented by rectangle 124. Control tube 131 is connected to the output pivot point of the bell crank 127 and extends upward to the input to the lateral cyclic actuator 134. Similarly, control tube 132 extends from the output pivot point on bell crank 126 to the input to the fore/aft cyclic actuator 133. Thus, the desired control inputs are transmitted to actuators 133 and 134.

The fore/aft cyclic actuator 133 is connected through the actuator output rod 136 to one input of the swashplate 16. The actuator 134 is connected by the actuator output rod 137 to a second input of the swashplate 16. Arms 138 comprise the swashplate reference structure.

In accordance with the invention, transmission 12 is mounted on the fuselage structure on shafts 140 and 141 which are aligned on the fore and aft pylon pivot axis. Thus, the fuselage may pivot relative to transmission 12 on the axis of shafts 140 and 141. A stub trunnion 142 extends from the transmission 12 at a point substantially below but parallel to the axis of shafts 140 and 141. A fore/aft spring 143 is attached between the stub trunnion 142 and the fuselage structure as represented by the rectangle 144.

An isolation tube 129 extends downward from the structure of the transmission 12, specifically from a point on actuator 133 to the outer end of the idler link 125. In a similar manner, an isolation tube 130 is connected from the structure of the lateral cyclic actuator 134 to the outer end of the idler link 128. The links 129 and 130 thus serve together with the idler links 125 and 128, respectively, to isolate rotational motion of the fuselage relative to transmission 12. More particularly, isolation tube 129 effectively moves the elevation of the outer end of the idler link 125 upon rotational motion of the fuselage on the axis of shafts 140 and 141 relative to mast 13. By this means, rotational motion between the fuselage and mast does not produce any control change as between the pilot's cyclic stick 101 and the linkages 18 leading to the pitch horns on the main rotor. It will be noted that the actuators 133 and 134 are positioned on opposite sides of the fore/aft center line of the transmission and slightly ahead of the pivot axis of shafts 140 and 141. Therefore, any rotational motion of the fuselage relative to transmission 12 on the axis of shafts 140 and 141 would, without the provision of the isolation links 129 and 130, introduce undesired control input to both the fore/aft and the lateral control systems. Isolation tube 130 serves to control the effective pivot point of the bell crank 127 by changing the vertical position of the outer end of the idler link 128.

While only one stub trunnion 142 has been shown with one spring 143 connected to the fuselage structure 144, it will be appreciated that a second such stub trunnion, spring and fuselage attachment will be provided at the side of the transmission 12 opposite trunnion 142.

Where the present invention is employed, the soft pylon mounting permits much of the relative rotation to occur on the pylon-to-fuselage pivot and this portion of the rotation does not alter the rotor-controls relationship due to the decoupling arrangement of the controls. Specifically in FIG. 4, the elevation of the outer end of the idler links 125 and 128 is controlled to avoid unwanted control motion. Idler links 125 and 128 thus serve as mixing levers.

It will be appreciated that the present invention has a further decided advantage or attribute in greatly improving the structure of such aircraft. There is achieved a significant reduction in the bending moments (stresses) in the main mast. This reduction is proportional to the amount that the main rotor flapping is reduced due to pylon tilting. The provision of a soft mounting together with decoupling either saves weight in the mast structure or greatly enhances the fatigue life of a given mast structure. More particularly, in a rigid rotor mounted system, the rotor mast must be constructed to have a given prescribed fatigue life. Through engineering the mast assumes a given set of dimensions and is made of materials having prescribed specifications. With the soft pylon mounting as embodied herein, the bending moments on the mast are so reduced that a lighter weight mast can be employed than otherwise would be prescribed. If the mast thus otherwise prescribed is used without change, it will have, in the soft mounting environment, an enhanced fatigue life over the same mast when mounted in a rigid system.

By way of example, the advantages of the present invention may be expressed numerically. For example, in a helicopter of the type manufactured and sold by Bell Helicopter Company of Fort Worth, Tex. and identified as the 206L Helicopter, the following parameters were involved. The distance A, FIG. 1, from the control plane to the pivot point 15 was 40 inches. The distance C from the pivot point 15 to the center of gravity was 30 inches. The spring rate $K_p$ of springs 30 and 31 was 63,000 inch/lbs per radian. The lift of the rotor was 3900 lbs. For such aircraft, the cyclic control input required per inch of CG displacement was as set out in the following table.

TABLE I

| CYCLIC REQUIRED PER INCH OF CG DISPLACEMENT | | |
|---|---|---|
| | Flexible Mounted Pylon | |
| Rigid Pylon | Conventional Controls | Decoupled Controls |
| .819°/In | .925°/In | .741°/In |
| 11.5% | — | 19.9% |

The last line of Table I expresses the percent of gain in control (c.g. travel allowed) compared to a helicopter having conventional controls. It will be noted that the flexible mounted pylon with controls decoupled in accordance with the present invention yields a 19.9% gain, i.e., a reduction in the amount of control required for change in the location of the center of gravity. The increased center of gravity travel capability is enhanced as the ratio C/A, FIG. 1, increases and also as the pylon mounting restraint is softened, i.e., as the spring rate of springs 30 and 31 is reduced.

In summary, if a fuselage has an offset c.g., the fuselage will tend to rotate until its c.g. is below the suspension point 15. The amount of this rotation is dependent upon the weight of the fuselage, the distance the c.g. is positioned below the suspension point 15 and the strength of the restraining springs 30 and 31 about the suspension point 15 between the pylon and the fuselage. Where the controls are decoupled as in accordance with the present invention, there is no change in the swashplate (control plane) angle relative to the mast as a result of the rotation of the fuselage about the pylon suspension point. The angle that the offset c.g. causes the fuselage to rotate will reduce the c.g. offset and thus the offset that the rotor controls will have to accommodate. This permits the available control to accommodate increased c.g. offsets as compared to a similar helicopter with either (1) a rigidly mounted pylon, or (2) a flexibly mounted pylon which does not have the decoupled controls.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a helicopter where a powered pylon drives a main rotor to support a fuselage in response to movement of input control elements, the combination comprising:

a. means to pivotally mount said fuselage to said pylon on a lateral axis for fore/aft rotation of said fuselage relative to said pylon, b. resilient means connected between said pylon and said fuselage to oppose said rotation, and
c. control linkage structure between said control elements and main rotor for isolating said control elements of said main rotor from the effect of said rotation in which said control linkage structure includes control tubes extending longitudinally of said fuselage from said input control elements, bell cranks connected to said control tubes and connected in turn by control tube structures connected to control the pitch of blades on said rotor, and mixing levers, one interposed between said fuselage and each of said bell cranks for altering the pivot points of said bell cranks relative to said fuselage, and means to control the positions of said pivot points in response to the rotation of said fuselage relative to said pylon by connecting isolation control tubes one to each control for the pitch of said rotor blades and to one of said mixing lever pivot points.

* * * * *